United States Patent
Wang

(10) Patent No.: US 6,614,774 B1
(45) Date of Patent: Sep. 2, 2003

(54) METHOD AND SYSTEM FOR PROVIDING WIRELESS MOBILE SERVER AND PEER-TO-PEER SERVICES WITH DYNAMIC DNS UPDATE

(75) Inventor: Jin Wang, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/205,963

(22) Filed: Dec. 4, 1998

(51) Int. Cl.[7] .................................................. H04Q 7/24
(52) U.S. Cl. ........................................ 370/338; 370/342
(58) Field of Search ........................ 370/401, 351–354, 370/328, 329, 389, 475, 431, 437, 337, 442; 455/432, 433, 435, 436, 450; 709/223, 217, 227, 245, 249

(56) References Cited

U.S. PATENT DOCUMENTS

| | | | |
|---|---|---|---|
| 5,590,175 A | 12/1996 | Gallant et al. | 455/433 |
| 5,790,548 A | 8/1998 | Sistanizadeh et al. | 370/389 |
| 5,793,762 A | 8/1998 | Penners et al. | 370/401 |
| 5,797,096 A | 8/1998 | Lupien et al. | 379/58 |
| 5,825,759 A * | 10/1998 | Liu | 370/331 |
| 5,872,523 A * | 2/1999 | Dellaverson et al. | 340/825.52 |
| 6,046,980 A * | 4/2000 | Packer | 370/230 |
| 6,052,725 A * | 4/2000 | McCann et al. | 709/223 |
| 6,137,791 A * | 10/2000 | Frid et al. | 370/352 |
| 6,147,986 A * | 11/2000 | Orsic | 370/349 |
| 6,226,523 B1 * | 5/2001 | Karlsson et al. | 455/466 |
| 6,230,012 B1 * | 5/2001 | Willkie et al. | 455/435 |
| 6,308,213 B1 * | 10/2001 | Valencia | 709/229 |
| 6,421,339 B1 * | 7/2002 | Thomas | 370/352 |

FOREIGN PATENT DOCUMENTS

EP     0 483 547 A     5/1992

* cited by examiner

*Primary Examiner*—Dang Ton
*Assistant Examiner*—Melanie Jagannathan

(57) ABSTRACT

A method and communications system provide data and voice services to subscribers at mobile terminals using dynamic IP address assignment and dynamic DNS update. A visited network dynamically assigns one of its IP addresses to a mobile terminal away from its home network accessing the visited network as a session IP address. The visited network transmits the assigned IP address to the home network of the mobile terminal over a private network. The home network associates the assigned IP address from the visited network with the host name of the mobile terminal in a DNS server of the home network and sends the host name to the visited network, although the visited network may already have received the host name from the mobile terminal. The visited network associates the host name of the mobile terminal with the assigned IP address its DNS server. Upon termination of the call by the mobile terminal, the visited network disassociates the assigned IP address with the host name in its DNS server and instructs the home network to do the same.

19 Claims, 4 Drawing Sheets

METHOD AND SYSTEM FOR PROVIDING WIRELESS MOBILE SERVER AND PEER-TO-PEER SERVICES WITH DYNAMIC DNS UPDATE

BACKGROUND OF THE INVENTION

The present invention relates in general to providing communications services, and, more particularly, to a method and system for using dynamic Internet protocol (IP) address assignment and dynamic DNS updates to provide wireless data and voice services to subscribers using mobile terminals, for example via the Internet.

Wireless or "mobile" telecommunications are well known for enabling subscribers to have immediate access to voice and data services while roaming large geographic areas. Presently, cellular and personal communication services (PCS) telephones are the most common form of mobile unit for wireless communications. Cellular/PCS telephones operate in cooperation with known wireless networks which include cell sites having controllers and radio transceivers, mobile telephone switching centers, and, of course, mobile units, i.e., portable telephones or handsets. Mobile telephone switching centers are known to those skilled in the art to comprise digital telephone exchanges which switch interconnections between telephony signaling networks and the cell sites for wireline-to-mobile and mobile-to-wireline connections and also for mobile-to-mobile connections. The mobile telephone switching centers also process mobile unit status data received from cell site controllers, switch calls between cells, process diagnostic information, and compile billing data.

Each subscriber to a wireless service is assigned to a wireless home network. The home network stores subscription information for the subscriber along with unique identification information, typically a number, for the mobile unit used by the subscriber. The subscriber is typically able to place and receive wireless calls anywhere within the home network's service area. Most subscribers are also able to place and receive wireless calls while roaming outside the service areas of their home networks since most wireless service providers either have service coverage in other areas or they have established roaming agreements with other service providers. Under roaming agreements, subscribers of a service provider that is a party to an agreement with other service providers can access networks of the other service providers in accordance with the terms of the agreement. Cellular/PCS networks accessed by subscribers roaming out of their wireless home networks are known to those skilled in the art as wireless visited networks. From the subscriber's perspective, a visited network can be either owned and operated by the same service provider who provides services in the home network, or by a different service provider with whom a roaming agreement exists.

In operation, when the mobile telephone switching center in one's home network receives a call from the telephony signaling network and the call is directed to a mobile device user registered with the home network, the mobile telephone switching center deciphers the received telephone number and alerts the controllers at the cell sites to page the corresponding mobile user. Similarly, when a mobile device user registered with the home network places a call in the home network's service area, the mobile telephone switching center in the home network receives the corresponding called number from the cell site controller and transmits the called number to the telephony signaling network.

On the other hand, when a mobile device user registered with the home network places a call outside the home network's service area, the mobile telephone switching center in the visited network communicates with the home network to authenticate the user and determine whether the mobile device user has authority to roam and to place the call. If authentication is confirmed by the home network, the mobile telephone switching center in the visited network accepts the called number from the cell site controller and transmits the called number to the telephony signaling network.

Wireless networks can also provide peer-to-peer and mobile server packet data operations. FIG. 1 illustrates a communications system 10 for peer-to-peer communication of packet data users and mobile servers. The communications system 10 comprises a plurality of wireless networks 11–13 coupled to an IP network 14, such as the Internet, by respective routers 15–17. A variety of communications devices may access the IP network 14 via the different cellular/PCS networks 11–13. As illustrated in FIG. 1, a mobile server 18 (host name: mobile-www.xyz.com) communicates with the IP network 14 via the first cellular/PCS network 11, a first voice/data mobile device 19, such as a smart phone, laptop, palm device, (host name: YourName.abc.com) communicates with the IP network 14 via the second cellular/PCS network 12 and a second voice/data mobile device 20 communicates with the IP network 14 via the third cellular/PCS network 13. A fixed host 21 communicates with the IP network 14 via a standard wireline connection.

Peer-to-peer communications include packet multimedia interactions between the fixed host 21 and the mobile devices 19, 20 and between the mobile devices 19, 20 themselves. Mobile server and client packet multimedia interactions are possible between the fixed host 21 and the mobile server 18 and between the mobile devices 19, 20 and the mobile server 18.

One of the most convenient means of denoting the destination end point of another party in either peer-to-peer or client-server communications is the use of host name notation. Thus, a fixed or mobile client can communicate with a mobile server by simply referring to the mobile server's host name, e.g., mobile-www.xyz.com. Similarly, a fixed or mobile peer can engage in an IP-telephony conversation with another mobile peer by simply referring to the other mobile peer's host name, e.g., YourName.abc.com. In each case, a Domain Name System (DNS) server associated with the network to which the host name is registered is responsible for translating the symbolic host name to its corresponding IP address which comprises four numbers separated by periods, e.g., 35.1.1.1, which is needed for standard IP packet routing over the IP network. Normally, the host name is registered to the home network to which the mobile device user is registered.

The IP address associated with a particular host name is typically assigned on a per session basis with the assigned IP address being reclaimed once the session ends. Such an assignment of IP addresses is known to those skilled in the art as dynamic IP address assignment. For example, as shown in FIG. 2, a wireless home network 24 could assign a session IP address dynamically to a mobile device user 26 using a mobile device 28 to communicate with the home network 24 and update the host name-to-IP address association in its DNS server 30 to allow peer-to-peer communication between the mobile device 28 and a fixed computer host 32 interfacing via an IP network 34. The home network 24 is coupled to the IP network 34 via a router 36. As the IP address assigned by the home network 24 and the host name are both registered with the home network 24, all DNS queries and packet transfers between the computer host 32 and the mobile device 28 are routed through the home network 24. Both forward and reverse DNS lookups about the mobile device 28 are resolvable by the DNS 30 when the mobile device 28 is connected to the IP network 34 through its home network 24. A forward DNS lookup is a request for the IP address associated with a particular host name while a reverse DNS lookup is a request for the host name associated with a particular IP address.

Referring now to FIG. 3, with like reference numerals referring to like components, the wireless home network 24 could also assign a dynamic address to the mobile device 28 connected through a visited network 38 and update the host name-to-IP address association in its DNS server 30 to allow peer-to-peer communications between the computer host 32 and the mobile device 28. The visited network 38 is connected to the IP network 34 via a router 40 and may be able to communicate with the home network 24 via a telephony signaling network 42. However, for such operation an IP tunnel 44 is formed between the router 36 of the home network 24 and the router 40 of the visited network 38 so that all DNS queries and standard IP packets destined to the IP address assigned by the home network 24 can be routed through the IP network 34 to the router 36 of the home network 24, the tunnel 44 and the router 40 of the visited network 38 to the mobile device 28. The tunnel 44 basically redirects the IP packets to the mobile device 28 over the IP network 34. While the tunnel 44 addresses the issue of mobility, it introduces extra end-to-end network latency or delay that could be long with possible severe impact on real-time applications like IP telephony.

One way to avoid the tunnel 44 and thus eliminate unnecessary network delay is to assign the roaming mobile device 28 an IP address local to the visited network 38. In this situation, a dynamic IP address local to the visited network 38 is assigned to the mobile device 28, and a DNS server 45 in the visited network 38 associates the host name of the mobile device 28 which is registered with the home network 24 with the local IP address which is registered with the visited network 38. Such an arrangement avoids the creation of the tunnel 44 and the inherent network delays. However, forward DNS lookup will fail because all queries concerning the IP address of the host name are transmitted to the home network that "owns" the domain name associated with the host name and there is no association between the host name and the IP address in the DNS server 30 of the home network 24. As a result of this forward DNS lookup failure, peer-to-peer and mobile server communications via host names cannot take place.

Accordingly, there is a need for a method and system for providing data and voice services to subscribers at mobile terminals that avoids DNS lookup failures and does not introduce additional unnecessary network delays. There is also a need for such a method and system that functions in a secure manner using existing infrastructure. There is a further need for such a method and system that is relatively easy to implement and cost effective.

SUMMARY OF THE INVENTION

The present invention meets these needs by providing a method and communications system providing data and voice services to subscribers at mobile terminals using dynamic IP address assignment. A visited network dynamically assigns one of its IP addresses to a mobile terminal accessing the visited network as a session IP address. The visited network transmits the assigned IP address to the home network of the mobile terminal over a private network. The home network associates the assigned IP address from the visited network with the host name of the mobile terminal in its DNS server and sends the host name to the visited network, although the visited network may already have received the host name from the mobile terminal. The visited network associates the host name of the mobile terminal with the assigned IP address in its DNS server. Upon termination of the data call by the mobile terminal, the visited network disassociates the assigned IP address with the host name in its DNS server and instructs the home network to do the same.

According to a first aspect of the present invention, a method of providing dynamic Internet protocol (IP) address assignment to a mobile terminal having a predetermined host name that is registered with a home network comprises assigning an IP address to the mobile terminal by a visited network accessed by the mobile terminal. The IP address is transmitted from the visited network to the home network using a private network. The host name of the mobile terminal is associated with the IP address assigned by the visited network in the home network.

The step of assigning an IP address to the host name of the mobile terminal by a visited network accessed by the mobile terminal may comprise accessing the visited network by the mobile terminal, establishing a communications link between the visited network and the home network using the private network, transmitting identification information of the mobile terminal from the visited network to the home network using the private network, authenticating the mobile terminal by the home network in response to the identification information, transmitting subscription information and authentication confirmation for the mobile terminal from the home network to the visited network using the private network, and assigning the IP address to the mobile terminal by the visited network in response to the subscription information and authentication information. The step of assigning the IP address to the mobile terminal by the visited network in response to the subscription information and authentication information may comprise requesting the IP address from a dynamic host configuration protocol (DHCP) server of the visited network, and associating the IP address with the host name of the mobile terminal registered with the home network in a domain name system (DNS) server in the visited network. The step of associating the host name of the mobile terminal with the IP address assigned by the visited network in the home network is carried out in a DNS server in the home network.

Preferably, the private network is a telephony signaling network, such as the American National Standards Institute 41 (ANSI-41) network, the Global System for Mobile Communications Mobile Application Part (GSM-MAP) network, or a combination of both networks. The method may further comprise the step of disassociating the IP address from the mobile terminal in the visited network and in the home network upon termination of access of the visited network by the mobile terminal. The mobile terminal may comprise a mobile server or a mobile voice and data device, such as a smart phone, laptop or Palm device. The method may further comprise the step of transmitting the host name of the mobile terminal from the mobile terminal or the home network to the visited network.

According to another aspect of the present invention, a communications system for providing voice and data services to mobile subscribers using mobile terminals is provided. The system comprises a home network and a visited network. The home network comprises a home location register (HLR) for storing and providing subscription information, identification information and authentication information of the mobile terminals registered with the home network, and a home DNS server mapping host names registered with the home network to the IP addresses assigned to the mobile terminals. The visited network comprises a visitors location register (VLR) in communication with the HLR in the home network by a private network, such as a telephony signaling network, a visited DNS server mapping host names to IP addresses, a visited dynamic host configuration protocol (DHCP) server having a plurality of IP addresses registered with the visited network, and a router providing access to an IP network. The visited network is configured to assign IP addresses registered with the visited network to mobile terminals accessing the visited network thereby providing the mobile terminals access to the IP network via the router. The visited network is further configured to transmit IP addresses assigned to the mobile terminals to the HLR using the private network. The home network is configured to associate the assigned IP addresses with corresponding host names of the mobile terminals in the home DNS server.

The visited network is preferably configured to assign IP addresses registered with the visited network to the mobile terminals accessing the visited network upon receipt of subscription information and authentication information from the HLR indicating that the mobile terminals have authority to access the visited network. The visited network may be further configured to associate the assigned IP addresses with the host names of the mobile terminals in the visited DNS server. The visited network is preferably configured to disassociate the assigned IP addresses from the host names of the mobile terminals in the visited DNS server upon termination of access of the visited network by the mobile terminals.

The VLR may be configured to instruct the HLR to disassociate the assigned IP addresses from the host names of the mobile terminals in the home DNS server upon termination of access of the visited network by the mobile terminals. The private network preferably comprises a telephony signaling network. Preferably, at least one of the mobile terminals is a mobile voice and data telephone or a mobile server. The system may further comprise a plurality of the visited networks. The mobile terminals may be configured to transmit the host name of the mobile terminals to the visited network. Alternatively, the HLR may be configured to transmit the host names of the mobile terminals to the visited network.

Accordingly, it is an object of the present invention to provide a method and system for providing data and voice services to subscribers at mobile terminals that avoid DNS lookup failures and does not introduce network delays. It is another object of the present invention to provide such a method and system that function in a secure manner using existing infrastructure. It is yet another object of the present invention to provide such a method and system that are relatively easy to implement and are cost effective.

Other features and advantages of the invention will be apparent from the following description, the accompanying drawings and the appended claims.

DETAILED DESCRIPTION OF THE INVENTION

Figure 1:
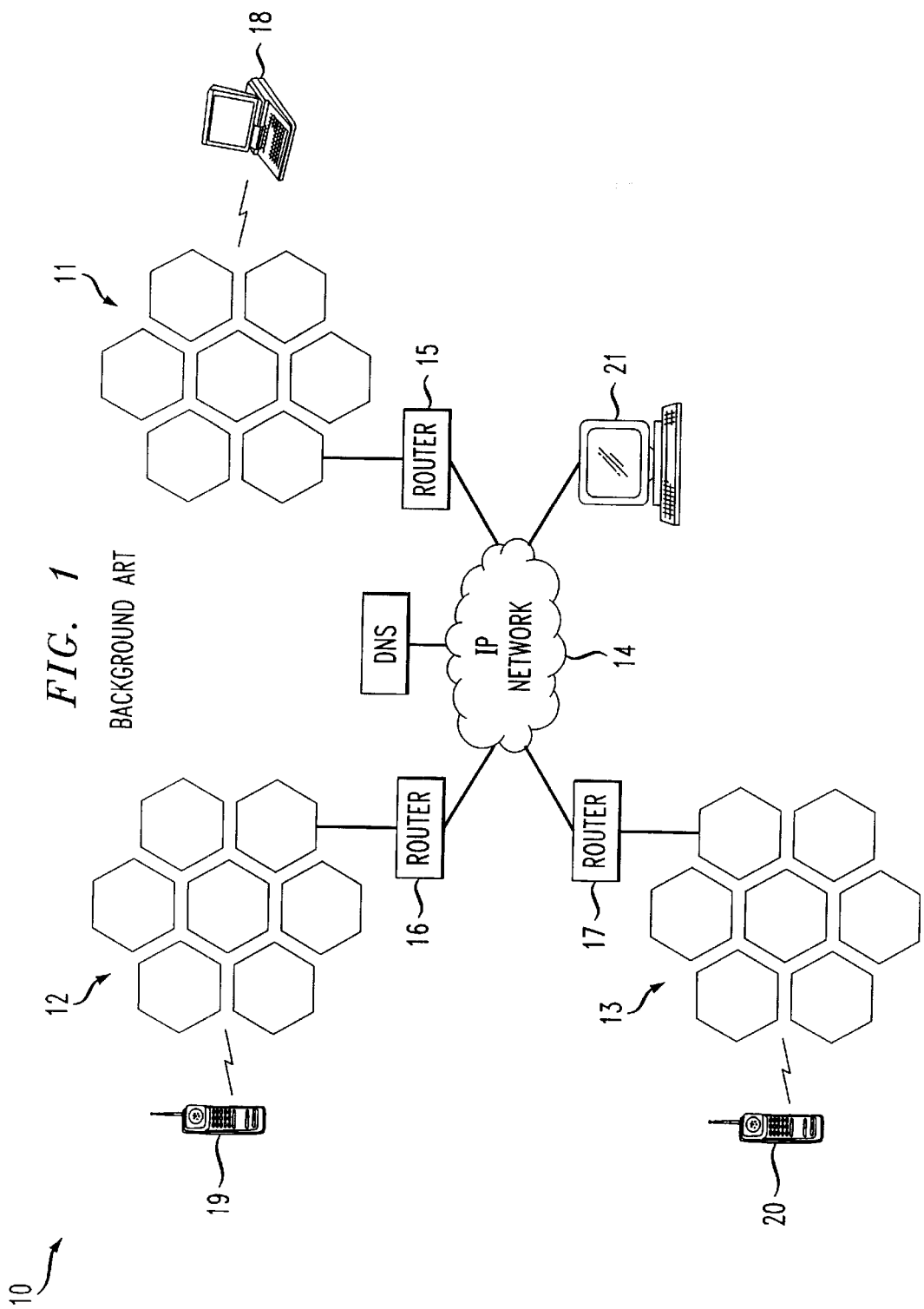
FIG. 1 illustrates a communications system according to background art.
Figure 2:
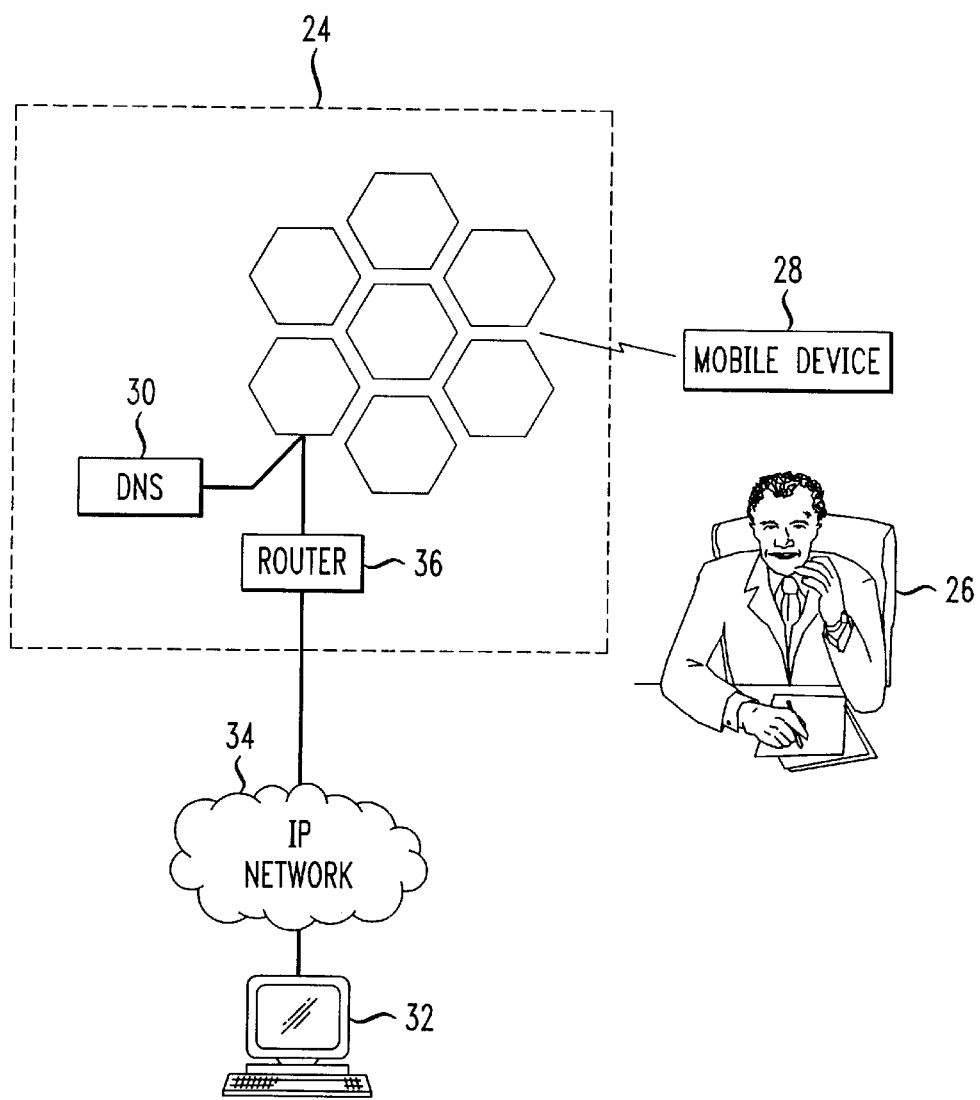
FIG. 2 illustrates communications between a mobile device connected to its home network and a host computer through the IP network according to the background art.
Figure 3:
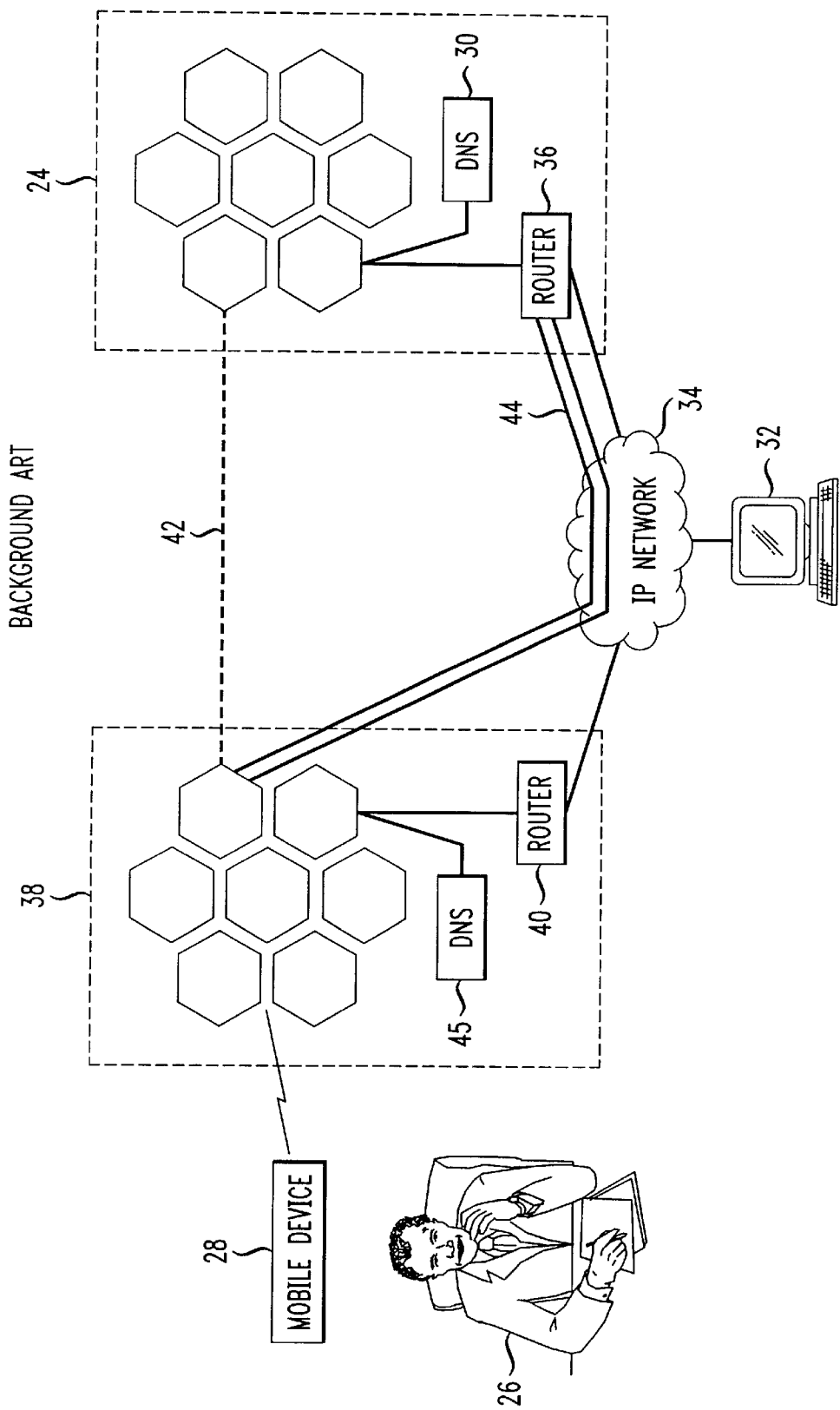
FIG. 3 illustrates communications between a mobile device connected to a visited network and a host computer through the IP network according to the background art.
Figure 4:
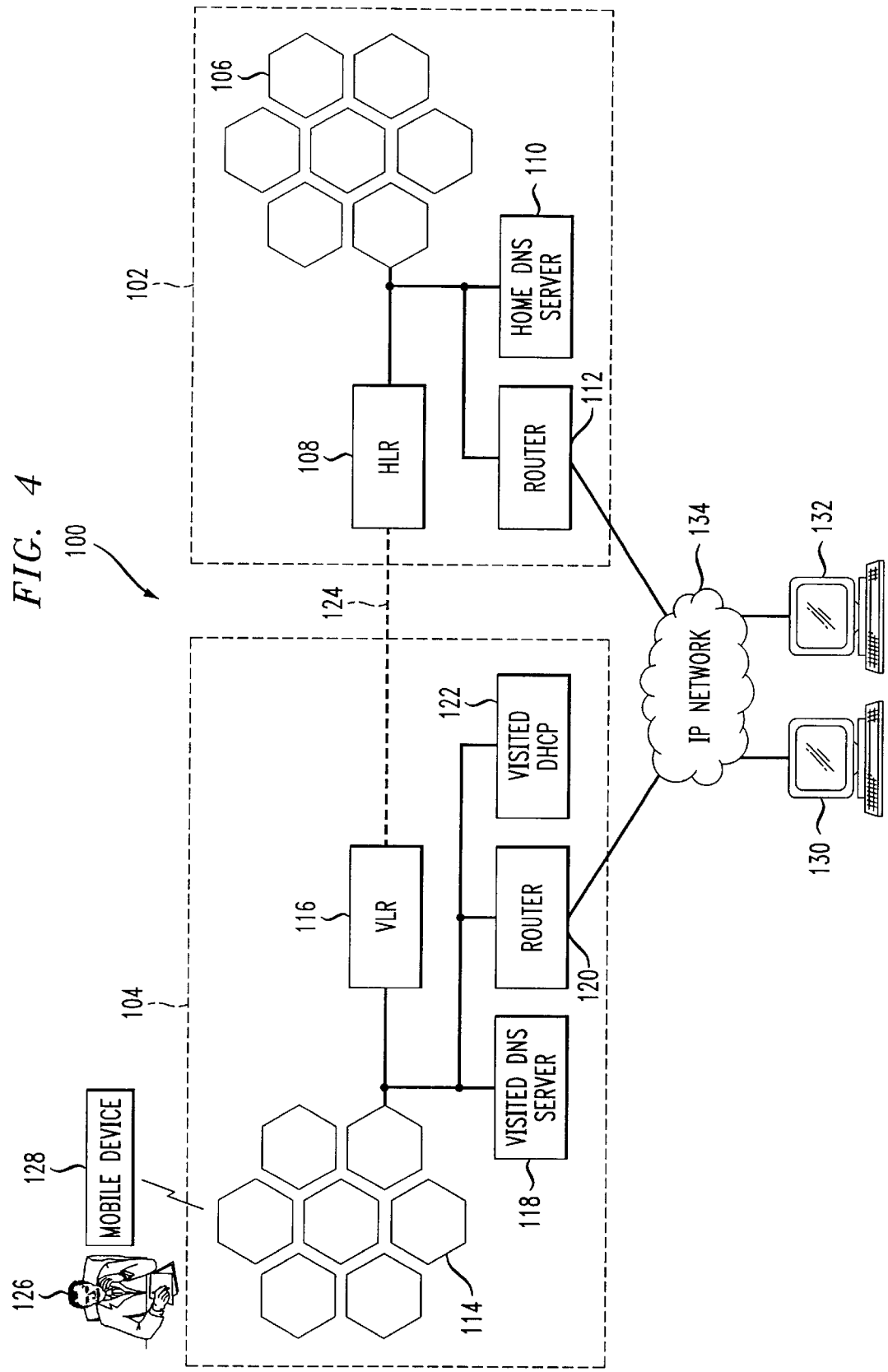
FIG. 4 illustrates a communications system operable according to the present invention.

Referring now to FIG. 4, a communications system 100 operable according to the present invention is illustrated. The communications system 100 comprises a home network 102 and a visited network 104. The home network 102 comprises a cellular/PCS site 106, a home location register (HLR) 108, a home Domain Name System (DNS) server 110 and a router 112. Similarly, the visited network 104 comprises a cellular/PCS site 114, a visitors location register (VLR) 116, a visited DNS server 118, a router 120 and a visited Dynamic Host Configuration Protocol (DHCP) server 122. The cellular/PCS sites 106, 114 each include radio transceivers (not shown) for transmitting and receiving calls to and from mobile terminals accessing the respective networks 102, 104. The radio transceivers are physically located at a plurality of different locations with the sum coverage of the transceivers defining the service areas of the networks.

The home network 102 and the visited network 104 communicate via a private network 124 accessed by the HLR 108 and the VLR 116, respectively. In the illustrated embodiment, the private network 124 comprises standard telephony signaling networks used in most wireline communications which provides a relatively secured means for the exchange of information between the home network 102 and the visited network 104. The telephony signaling networks preferably comprise ANSI41 networks, GSM-MAP networks or a combination of both of these networks. Exchanges of information between the home network 102 and the visited network 104 are relatively secured because access to the private network 124 is limited to authorized networks only.

The HLR 108 is a network element that works with its peer the VLR 116 to provide user services to a mobile user 126 accessing the visited network 104 via a mobile terminal 128. The mobile user 126 is registered with the home network 102 to receive wireless voice and data services using the mobile terminal 128. The mobile terminal 128 is programmed with unique identification information identifying the network 102 as the home network. It should thus be apparent that the home and visited designations for the networks 102, 104 are specific to the particular mobile user 126 and that the home network for one user could be a visited network for another user. It will be appreciated by those skilled in the art that the communications system 100 may include a plurality of visited networks in communication with the home network 102.

In the illustrated embodiment, the mobile terminal 128 comprises either a voice/data mobile device or a mobile server having a host name that is registered with the home network 102. Such a mobile terminal enables the mobile user 126 to perform packet operations with other mobile terminals (not shown) or the fixed computer hosts 130, 132 via an IP network 134, such as the Internet. The home and visited networks 102, 104 provide access to the IP network 134 via respective routers 112, 120. As the assigned host name, e.g., hostname.xyz.com, is registered with the home network 102, any DNS queries with respect to the IP address assigned to the host name are directed to the home network 102 which owns the domain name associated with the host name. The home DNS server 110 is configured to respond to such queries by translating all host names owned by the home network 102 to their corresponding IP addresses which are needed for standard IP packet routing over the IP network 134. In the illustrated embodiment, IP addresses are assigned dynamically to the host names on a session by session basis such that an IP address assigned to a particular host name will likely vary from one session to another. The home DNS server 110 maintains an association between host names and assigned IP addresses.

The HLR 108 includes a database (not shown) of user service profiles and identification information. Each mobile user has a user service profile associated with the identification information of the mobile terminal which includes the subscription information of the mobile user. The subscription information includes information as to the services the mobile user is entitled to receive. For example, such services may include the right to roam, call forwarding, caller ID, three-way calling, packet data services and the like. The HLR 108 also includes authentication information associated with each mobile user to ensure that the mobile terminal attempting to place a call is valid.

In the illustrated embodiment, the mobile user 126 is roaming in the service area of the visited network 104 and places a data session call using the mobile terminal 128 having a host name registered with the home network 102. The mobile terminal 128 transmits its identification information to the visited network 104 as part of the process of registration or origination of the call. The visited network 104 may be owned and operated by the same service provider that operates the home network 102 of the mobile user 126 and the visited network 104 communicates with the home network 102 to determine whether the mobile user 126 has authority to access the visited network 104. Alternatively, if the visited network 104 is owned and operated by a service provider different from the one that owns and operates the home network 102 of the mobile user 126, the visited network determines through the VLR 116 if it has a roaming agreement with the home network 102 which would allow the mobile user 126 to access the visited network 104. If the visited network 104 is owned and operated by the same service provider that owns and operates the home network 106 or if there is a roaming agreement in place, the visited network 104 processes the call. The visited network 104 then contacts the home network 102 via the private network 124 and transmits the mobile terminal's identification information to determine if the mobile user 126/mobile terminal 128 has authority to place the call. The HLR 108 retrieves the subscription information and performs authentication for the user based on the user's particular identification information and responds to the VLR 116. Upon verification that the mobile user 126 has rights to place the call in the form of authentication confirmation from the home network 102, the visited network 104 assigns the mobile terminal 128 an IP address via the visited DHCP 122.

The visited DHCP 122 includes a database (not shown) of dynamic IP addresses registered with the visited network 104, e.g., 61.1.8.8. The dynamic IP addresses managed by the visited DHCP 122 are assigned to host names on a session by session basis such that the visited DHCP 122 tracks the pool of assigned and unassigned IP addresses. The visited network 104 instructs the visited DNS server 118 to associate the mobile terminal 128 with the assigned IP address for the duration of the data session. The visited network 104 transmits the assigned IP address local to the visited network 104 to the home network 102 via the private network 124. The home network 102 instructs the home DNS server 110 to associate the assigned IP address with the host name of the mobile terminal 128. The home network 102, through the HLR 108, transmits the host name of the mobile terminal 128 to the visited network 104. The visited network 104 instructs the visited DNS server 118 to associate the host name of the mobile terminal 128 with the assigned IP address. It will be appreciated by those skilled in the art that the mobile terminal 128 itself may transmit its host name to the visited network 104. Peer-to-peer and mobile server services may now be initiated with the mobile terminal 128.

For example, the fixed computer host 132 may initiate an IP phone call or H.323 session with the mobile terminal 128 using the host name of the mobile terminal 128 as the destination. A forward DNS lookup request is initiated by the fixed computer host 132 to determine the IP address associated with the host name of the mobile terminal 128. As the host name of the mobile terminal 128 is owned by the home network 102, the forward DNS lookup request is routed to the home network 102. Since the home DNS server 110 was dynamically updated with the IP address assigned by the visited network 104, the assigned IP address is transmitted to the fixed computer host 132, as a response of the home DNS server 110 to the DNS lookup request made by the fixed computer host 132. IP packet transmissions between the fixed computer host 132 and the mobile terminal 128 may proceed.

Alternatively, the fixed computer host 130 may initiate a reverse DNS lookup request to determine the host name associated with the assigned IP address. As the assigned IP address is registered with the visited network 104, the reverse DNS lookup request is routed to the visited network 104. Since the visited DNS server 118 includes an association between the assigned IP address and the host name of the mobile terminal 128, the host name of the mobile terminal 128 is transmitted to the fixed computer host 130. The communications system 100 therefore enables forward and reverse DNS lookups to be completed successfully. It will be appreciated by those skilled in the art that mobile device or mobile servers may also be used to request the forward and reverse DNS lookups as well as to communicate with the mobile terminal 128.

As the IP address is assigned by the visited network 104, all packet transfers between the computer hosts 130, 132 and the mobile terminal 128 are routed through the visited network 104. Specifically, a packet transfer from the computer host 130 proceeds from the computer host 132 to the IP network 134, to the router 120, to the cellular/PCS site 104 and then to the mobile terminal 128. No additional or unnecessary network delays are created as a result of this setup as data is transmitted directly between the host computer 130 and the visited network 104.

Once the data session is complete, the visited network 104 also instructs the visited DNS server 118 to disassociate the host name of the terminal 128 from the assigned IP address. The assigned IP address is "returned" to the visited DHCP 122 for use by another terminal. As part of the disassociation, the host name of the terminal 128 is removed from the visited DNS server 118. The visited network 104 also instructs the home network 102 to disassociate the host name of the terminal 128 from the assigned IP address via the private network 124. The host name of the terminal 128 is thus disassociated from the IP address assigned by the visited network 104 in the home DNS server 110.

Both the home DNS server 110 and the visited DNS server 114 are updated dynamically and the updates are considered secure using the private network 124. It is important that both of the updates are done in a secure manner to prevent malicious attacks or fraudulent associations. The private network 124 is preferably telephony signaling networks that already exists in wireless inter-system communications and are used to transmit such sensitive information as home network ID, mobile terminal ID, user's service profile and authentication related information. Access to and use of the telephony signaling networks are limited to authorized wireless operators and trusted parties. It will be appreciated by those skilled in the art that other private networks may be used so as to dynamically update the home DNS server 110 in a secure manner.

Having described the invention in detail and by reference to preferred embodiments thereof, it will be apparent that modifications and variations are possible without departing from the scope of the invention defined in the appended claims.

What is claimed is:

1. A method of providing dynamic Internet protocol (IP) address assignment to a mobile terminal having a predetermined host name that is registered with a home network, said method comprising the steps of:
    assigning an IP address to said mobile terminal by a visited network accessed by said mobile terminal;
    transmitting said IP address from said visited network to said home network using a private network; and
    associating said host name of said mobile terminal with said IP address assigned by said visited network in said home network, wherein said step of assigning an IP address to said host name of said mobile terminal by a visited network accessed by said mobile terminal comprises the steps of:
        accessing said visited network by said mobile terminal;
        establishing a communications link between said visited network and said home network using said private network;
        transmitting identification information of said mobile terminal from said visited network to said home network using said private network;
        authenticating said mobile terminal by said home network in response to said identification information;
        transmitting subscription information and authentication confirmation for said mobile terminal from said home network to said visited network using said private network; and
        assigning said IP address to said mobile terminal by said visited network in response to said subscription information and authentication confirmation.

2. The method of claim 1, wherein said step of assigning said IP address to said mobile terminal by said visited network in response to said subscription information and authentication information comprises the steps of:
    requesting said IP address from a dynamic host configuration protocol (DHCP) server in said visited network; and
    associating said IP address with said host name of said mobile terminal registered with said home network in a domain name system (DNS) server in said visited network.

3. The method of claim 2, wherein said step of associating said host name of said mobile terminal with said IP address assigned by said visited network in said home network is carried out in a DNS server in said home network.

4. The method of claim 2, further comprising the step of transmitting said host name of said mobile terminal from said mobile terminal to said visited network.

5. The method of claim 2, further comprising the step of transmitting said host name of said mobile terminal from said home network to said visited network.

6. A method of providing dynamic Internet protocol (IP) address assignment to a mobile terminal having a predetermined host name that is registered with a home network, said method comprising the steps of:
    assigning an IP address to said mobile terminal by a visited network accessed by said mobile terminal;
    transmitting said IP address from said visited network to said home network using a private network;
    associating said host name of said mobile terminal with said IP address assigned by said visited network in said home network; and
    disassociating said IP address from said mobile terminal in said visited network and in said home network upon termination of access of said visited network by said mobile terminal.

7. A communications system for providing voice and data services to mobile subscribers using mobile terminals, said system comprising:
    a home network comprising a home location register (HLR) for storing and providing subscription information, identification information and authentication information of said mobile terminals registered with said home network, and a home DNS server mapping host names registered with said home network to IP addresses assigned to said mobile terminals; and
    a visited network comprising a visitors location register (VLR) in communication with said HLR by a private network for managing calls initiated by said mobile terminals to said visited network, a visited DNS server mapping host names to IP addresses, a visited dynamic host configuration protocol (DHCP) server having a plurality of IP addresses registered with said visited network, and a router providing access to an IP network;
    wherein said visited network is configured to dynamically assign IP addresses registered with said visited network to ones of said mobile terminals accessing said visited network thereby providing said mobile terminals access to said IP network via said router, said visited network being further configured to transmit IP addresses assigned to said ones of said mobile terminals to said HLR using said private network, and wherein said home network is configured to dynamically associate said dynamically assigned IP addresses with corresponding host names of said ones of said mobile terminals in said home DNS server.

8. The system of claim 7, wherein said visited network is configured to assign IP addresses registered with said visited network to ones of said mobile terminals accessing said visited network upon receipt of subscription information and authentication information from said HLR indicating that said ones of said mobile terminals have authority to access said visited network.

9. The system of claim 7, wherein said visited network is configured to dynamically associate said assigned IP addresses with said host names of said ones of said mobile terminals in said visited DNS server.

10. The system of claim 9, wherein said visited network is configured to disassociate said assigned IP addresses from said host names of said ones of said mobile terminals in said visited DNS server upon termination of access of said visited network by said ones of said mobile terminals.

11. The system of claim 10, wherein said VLR is configured to instruct said HLR to disassociate said assigned IP addresses from said host names of said ones of said mobile terminals in said home DNS server upon termination of access of said visited network by said mobile terminals.

12. The system of claim 7, wherein said private network comprises a telephony signaling network.

13. The system of claim 12, wherein said telephony signaling network comprises at least one of a ANSI-41 network or a GSM-MAP network.

14. The system of claim 7, wherein at least one of said ones of said mobile terminals is a mobile voice and data device.

15. The system of claim 14, wherein said mobile voice and data device is selected from a smart phone, a laptop computer or a Palm device.

16. The system of claim 15, wherein at least one of said ones of said mobile terminals is a mobile server.

17. The system of claim 7, further comprising a plurality of said visited networks.

18. The system of claim 7, wherein said ones of said mobile terminals transmit said host name of said ones of said mobile terminals to said visited network.

19. The system of claim 7, wherein said HLR is configured to transmit said host names of said ones of said mobile terminals to said visited network.

* * * * *

UNITED STATES PATENT AND TRADEMARK OFFICE
CERTIFICATE OF CORRECTION

PATENT NO. : 6,614,774 B1 Page 1 of 1
DATED : September 2, 2003
INVENTOR(S) : Jin Wang It is certified that error appears in the above-identified patent and that said Letters Patent is hereby corrected as shown below:

Column 12,
Line 4, "claim 15, wherein" should read -- claim 7, wherein --.

Signed and Sealed this

Twenty-third Day of March, 2004

JON W. DUDAS
*Acting Director of the United States Patent and Trademark Office*